(12) United States Patent
Sato et al.

(10) Patent No.: US 12,034,488 B2
(45) Date of Patent: Jul. 9, 2024

(54) OPTICAL COMMUNICATION DEVICE

(71) Applicant: Shimadzu Corporation, Kyoto (JP)

(72) Inventors: Keiko Sato, Kyoto (JP); Naoki Nishimura, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 29 days.

(21) Appl. No.: 17/795,345

(22) PCT Filed: Jan. 27, 2020

(86) PCT No.: PCT/JP2020/002850
§ 371 (c)(1),
(2) Date: Jul. 26, 2022

(87) PCT Pub. No.: WO2021/152678
PCT Pub. Date: Aug. 5, 2021

(65) Prior Publication Data
US 2023/0054439 A1    Feb. 23, 2023

(51) Int. Cl.
*H04B 10/80* (2013.01)
*G01S 7/4912* (2020.01)
*H04B 10/11* (2013.01)
*H04B 10/112* (2013.01)
*H04B 10/69* (2013.01)
*G01S 17/88* (2006.01)

(52) U.S. Cl.
CPC ............ *H04B 10/69* (2013.01); *G01S 7/4918* (2013.01); *H04B 10/11* (2013.01); *H04B 10/112* (2013.01); *H04B 10/80* (2013.01); *G01S 17/88* (2013.01)

(58) Field of Classification Search
CPC .. H04B 10/11–116; H04B 10/60–6973; H04B 10/80; H04B 10/803; G01S 17/88
(Continued)

(56) References Cited

U.S. PATENT DOCUMENTS

| | | | | |
|---|---|---|---|---|
| 2009/0310976 A1* | 12/2009 | Nakagawa | ......... | H04B 10/1141 398/183 |
| 2016/0373192 A1* | 12/2016 | D'Errico | .............. | H04B 10/803 |
| 2017/0207850 A1* | 7/2017 | Takahashi | .............. | H04B 10/60 |

FOREIGN PATENT DOCUMENTS

| | | | | |
|---|---|---|---|---|
| CN | 203675113 U | 6/2014 | | |
| JP | 58105642 A * | 6/1983 | ......... | H04B 10/1149 |

(Continued)

OTHER PUBLICATIONS

Notification of Reasons for Refusal dated Apr. 10, 2023 of Japanese Patent application No. 2021-573651, and its machine translation.
(Continued)

*Primary Examiner* — Li Liu
(74) *Attorney, Agent, or Firm* — Muir Patent Law, PLLC (57) ABSTRACT

An optical communication device 1 is provided with: a plurality of light-receiving elements 11 each configured to receive light and output a light detection signal; a plurality of optical fibers 13 provided to correspond to the plurality of light-receiving elements 11, respectively, the plurality of optical fibers each being configured to guide the light to the corresponding light-receiving element 11; a plurality of amplifiers 18 provided to correspond to the plurality of light-receiving elements 11, respectively, the plurality of amplifiers each being configured to generate optical communication information by performing signal processing on the light detection signal; a light intensity information collection unit 25 configured to collect intensity of the light received by each of the plurality of optical fibers 13 as light intensity information; an optical fiber identification unit 27 configured to identify the optical fiber 13 that is receiving relatively strong light out of the plurality of optical fibers 13, based on the light intensity information La to Le collected by the light intensity information collection unit 25; and a switch controller 29 configured to control to turn on the
(Continued)

amplifier 18, the amplifier 18 being provided to correspond to the optical fiber 13 identified by the optical fiber identification unit 27.

5 Claims, 8 Drawing Sheets

(58) Field of Classification Search
USPC .................. 398/104–105, 118–131, 202–214
See application file for complete search history.

(56) References Cited

FOREIGN PATENT DOCUMENTS

| JP | S58-105642 A | 6/1983 | |
| JP | 03062637 A * | 3/1991 | ............. H04B 10/02 |
| JP | H03-062637 | 3/1991 | |
| JP | 2018007069 A | 1/2018 | |
| JP | 2019186595 A | 10/2019 | |
| WO | 2015/096862 A1 | 7/2015 | |
| WO | 2016013188 A1 | 1/2016 | |

OTHER PUBLICATIONS

Search report from EPO for corresponding application dated Sep. 25, 2023.
Notification of Reasons for Refusal dated Sep. 15, 2023 of Japanese Patent application No. 2021-573651, and ts machine translation.
Decision of Refusal dated Mar. 28, 2022 for Taiwan Patent application No. TW109142403.
Non-final Rejection dated Jun. 30, 2021 for Taiwan Patent application No. TW109142403.

* cited by examiner

OPTICAL COMMUNICATION DEVICE

TECHNICAL FIELD

The present invention relates to an optical communication device.

BACKGROUND ART

Conventionally, communication using acoustic waves with low attenuation in water has been used as an underwater wireless communication means for transmitting data from an underwater vehicle, etc., for underwater exploration. Such wireless communication by acoustic waves has been problematic in that only communication speeds as low as several tens of kbps can be realized due to the low underwater propagation speed of acoustic waves and the low frequencies of acoustic waves.

In recent years, an optical wireless communication system using an optical communication device utilizing visible light has been proposed as an underwater wireless communication means. The optical communication device is provided with a laser light source for emitting laser light which is visible light and an optical receiver for receiving the laser light emitted from the laser light source. As one example of the optical wireless communication system, the following configuration can be exemplified (see. e.g., Patent Documents 1 and 2). That is, in this configuration, wireless communication is performed by transmitting communication light between a first optical communication device provided on an observation device installed underwater and a second optical communication device provided on a submersible vehicle navigating underwater.

Laser light, which is communication light, has a certain limit on the distance through which the laser light can propagate underwater. Therefore, in a conventional optical wireless communication system, especially in a case where communication is performed between a fixed body fixedly installed underwater and a moving body moving underwater, the following configuration is adopted. That is, the underwater optical wireless communication is initiated after confirming that the communication partner has entered the optical communicable range by acoustic positioning using acoustic waves.

PRIOR ART DOCUMENT

Patent Document

Patent Document 1: Japanese Unexamined Patent Application Publication No. 2018-007069
Patent Document 2: Japanese Unexamined Patent Application Publication No. 2019-186595

SUMMARY OF THE INVENTION

Problems to be Solved by the Invention

However, in the case of a conventional example having the above-described configuration, there are following problems.

In a conventional configuration in which the position of the communication partner is confirmed by acoustic positioning, it is difficult to improve the confidentiality of the communication. That is, since the acoustic waves are low in directivity, the possibility of being intercepted is high. Further, in the case of using acoustic positioning, in the optical communication device, it requires a device for generating and detecting acoustic waves in addition to a system for transmitting communication light. Consequently, there are concerns that an optical communication device increases in size and weight.

The present invention has been made in view of the above-described circumstances. An object of the present invention is to provide an optical communication device capable of performing highly reliable communication while avoiding an increase in the size of a device and a decrease in the confidentiality of communication.

Means for Solving the Problems

A first aspect of the present invention relates to an optical communication device comprising:
  a plurality of light-receiving elements each configured to output a light detection signal by receiving light;
  a plurality of optical fibers provided to correspond to the plurality of light-receiving elements, respectively, the plurality of optical fibers each being configured to guide the light to the corresponding light-receiving element;
  a plurality of signal processing units provided to correspond to the plurality of light-receiving elements, respectively, the plurality of signal processing units each being configured to generate optical communication information by performing signal processing on the light detection signal;
  a light intensity information collection unit configured to collect intensity of the light incident on each of the plurality of optical fibers as light intensity information;
  an optical fiber identification unit configured to identify the optical fiber on which relatively strong light is incident out of the plurality of optical fibers, based on the light intensity information collected by the light intensity information collection unit; and
  a signal processing controller configured to control to turn on the signal processing unit, the signal processing unit being provided to correspond to the optical fiber identified by the optical fiber identification unit.

Effects of the Invention

The optical communication device according to the present invention is provided with a light intensity information collection unit. This light intensity information collection unit collects the intensity of light incident on each of the plurality of optical fibers for guiding the light to the plurality of light-receiving elements for outputting a light detection signal by receiving the light as light intensity information. The optical fiber identification unit identifies the optical fiber on which relatively strong light is incident out of the optical fibers, based on the collected light intensity information.

The identified optical fiber is an optical fiber positioned relatively close to the communication partner generating the light. Therefore, as a consequence of the control by the signal processing controller, it is possible to perform optical communication using the optical fiber capable of efficiently performing the signal processing of the light. Therefore, it is possible to avoid a situation in which the S/N ratio is lowered by using an optical fiber positioned far from the communication partner. Further, highly directional optical communication is used to identify an optical fiber positioned relatively close to the communication partner. Therefore, the reliability of the optical communication can be improved while improving the confidentiality of the communication.

Further, it is not required to perform acoustic positioning using an acoustic device. Therefore, miniaturization and weight reduction of the optical communication device can be easily realized.

EMBODIMENTS FOR CARRYING OUT THE INVENTION

Hereinafter, some embodiments of the present invention will be described with reference to the attached drawings.

First Embodiment

<Description of Overall Configuration>

Figure 1:
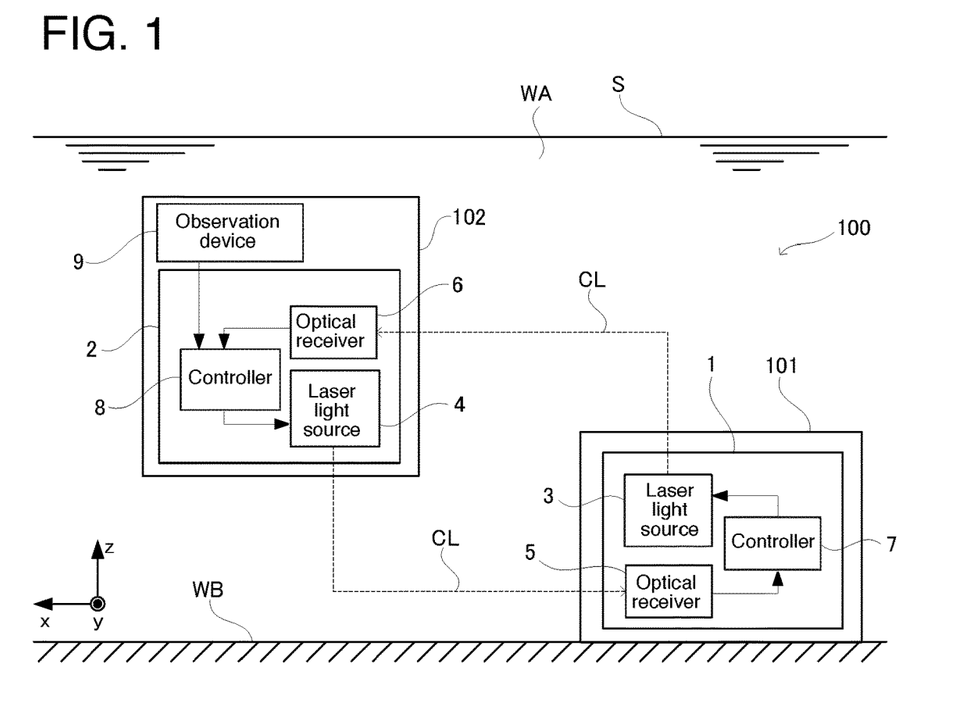
FIG. 1 is a block diagram describing a schematic configuration of an optical communication device according to a first embodiment.

With reference to FIG. 1, a schematic configuration of an underwater optical communication system 100 equipped with an optical communication device according to a first embodiment will be described. Note that, as shown in FIG. 1, etc., two horizontal directions perpendicular to each other are denoted as an x-direction and a y-direction. The x-direction corresponds to the right and left horizontal direction in the drawing. Further, the vertical orientation is denoted as a z-direction.

As shown in FIG. 1, in the water WA, the underwater optical communication system 100 is provided with a first optical communication device 1 and a second optical communication device 2. The first optical communication device 1 is arranged in a fixed structure 101 installed on the water bottom WB. The fixed structure 101 is exemplified by a pipeline, an underwater base for observation, and the like. The fixed structure 101 is connected to an external station (not shown) via a cable. The external station is exemplified by a ship on the water, a ground base installed on the ground, and the like.

The second optical communication device 2 is provided on a moving body 102 that moves in the water WA. The moving body 102 performs an inspection of an underwater structure and the like while moving in the water WA exemplified by the sea. The moving body 102 is exemplified by an ROV (Remotely Operated Vehicle), an AUV (Autonomous Underwater Vehicle), and the like. In FIG. 1, the water surface is denoted by a reference symbol S.

As shown in FIG. 1, the first optical communication device 1 is provided with a laser light source 3, an optical receiver 5, and a controller 7. The second optical communication device 2 is provided with a laser light source 4, an optical receiver 6, a controller 8, and an observation device 9. The first optical communication device 1 corresponds to an optical communication device according to the present invention.

The laser light source 3 and the laser light source 4 are each provided with a semiconductor laser and a collimating lens. The laser light source 3 and the laser light source 4 are each configured to adjust the laser light generated by the laser diode to parallel light with the collimating lens and emit the parallel light into the water WA. The light emitted by the laser light source 3 or the laser light source 4 is exemplified by, in addition to communication light CL containing communication information, search light SL not containing communication information.

The optical receiver 5 is configured to receive the laser light emitted from the laser light source 4 provided on the second optical communication device 2. The controller 7 is equipped with a central processing unit (CPU: Central Processing Unit), etc. The controller 7 is configured to perform various processing for the information contained in the laser light received by the optical receiver 5 and collectively control each configuration provided in the first optical communication device 1.

The optical receiver 6 is configured to receive the laser light emitted from the laser light source 3 provided in the first optical communication device 1. The controller 8 is configured to perform various processing on the information contained in the laser light received by the optical receiver 6 and collectively control each configuration provided in the second optical communication device 2. The observation device 9 is exemplified by an underwater camera and is configured to observe the observation target in the water WA to acquire the information, such as, e.g., a still image and a moving image.

As described above, the underwater optical communication system 100 is configured such that the first optical communication device 1 and the second optical communication device 2 can perform optical wireless communication in the water WA by transmitting laser light from one of the optical communication devices to the other. In the first embodiment, the description will be directed to the case in which the second optical communication device 2 transmits laser light to the first optical communication device 1.

Figure 2:
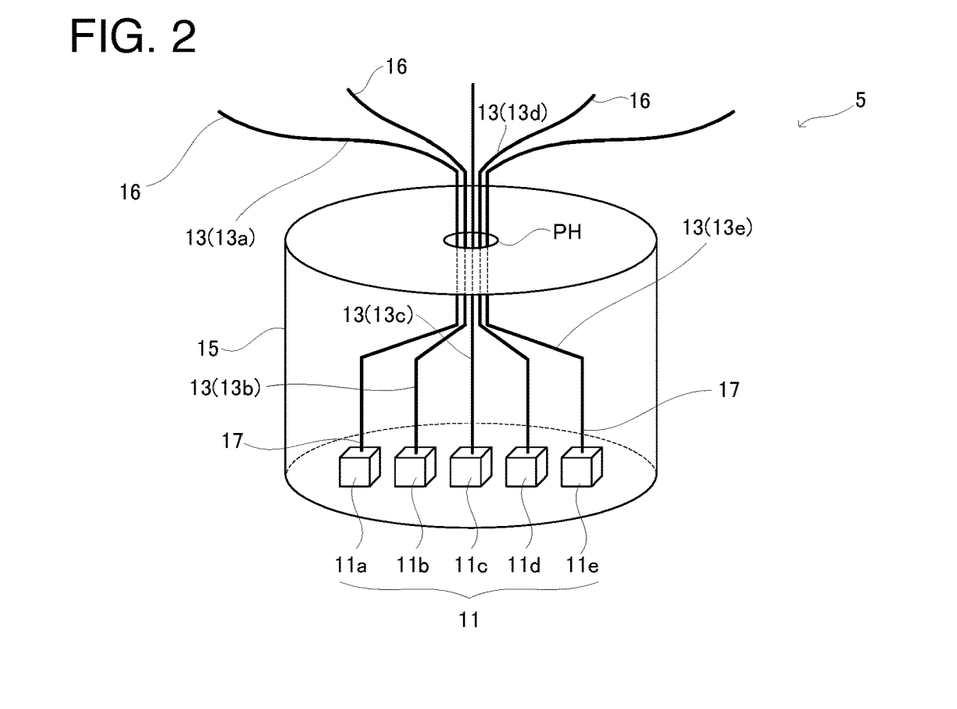
FIG. 2 is a diagram for explaining a schematic configuration of an optical receiver according to the first embodiment.

FIG. 2 shows a schematic configuration of the optical receiver 5. The optical receiver 5 is provided with a plurality of light-receiving elements 11, a plurality of optical fibers 13, and a protection container 15. Each of the light-receiving elements 11 is configured to perform photoelectric conversion by receiving the light exemplified by communication light CL or search light SL. The light-receiving element 11 is exemplified by a photomultiplier tube, an avalanche diode, or the like. In this embodiment, the optical receiver 5 is provided with five light-receiving elements 11. The five light-receiving elements 11 are assigned by the symbols of light-receiving elements 11a to 11e to distinguish them.

Each of the plurality of optical fibers 13 is provided to correspond to the plurality of light-receiving elements 11, respectively, and each is configured to guide the light to the corresponding light-receiving element 11. That is, in this embodiment in which five light-receiving elements 11 are provided, five optical fibers 13 are provided, and one optical fiber 13 is provided for one light-receiving element 11.

Each optical fiber 13 has a light-incident end portion 16 for receiving light and a light-emission end portion 17 for emitting the incident light. The light-emission end portion 17 is arranged to face or contact the light-receiving element 11. Preferably, the light-incident end portion 16 is provided with a condenser lens for condensing light. By providing a condenser lens at the light-incident end portion 16, the condensed light is incident on the optical fiber 13, and therefore, it is possible to further improve the accuracy of the optical communication.

For the plurality of optical fibers 13, the optical fiber 13 corresponding to the light-receiving element 11a is distinguished by assigning the reference symbol 13a. That is, the light-receiving elements 11a to 11e are arranged so as to correspond to the optical fibers 13a to 13e, respectively.

The protection container 15 is a sealed water pressure-resistant container disposed in the water WA. The plurality of light-receiving elements 11 is disposed inside the protection container 15 and is isolated from the external environment, such as, e.g., underwater WA. The protection container 15 is equipped with a penetration hole PH. The penetration hole PH is configured to allow a plurality of optical fibers 13 to pass therethrough while maintaining the inside of the protection container 15 in a sealed water-tight condition.

Figure 4:
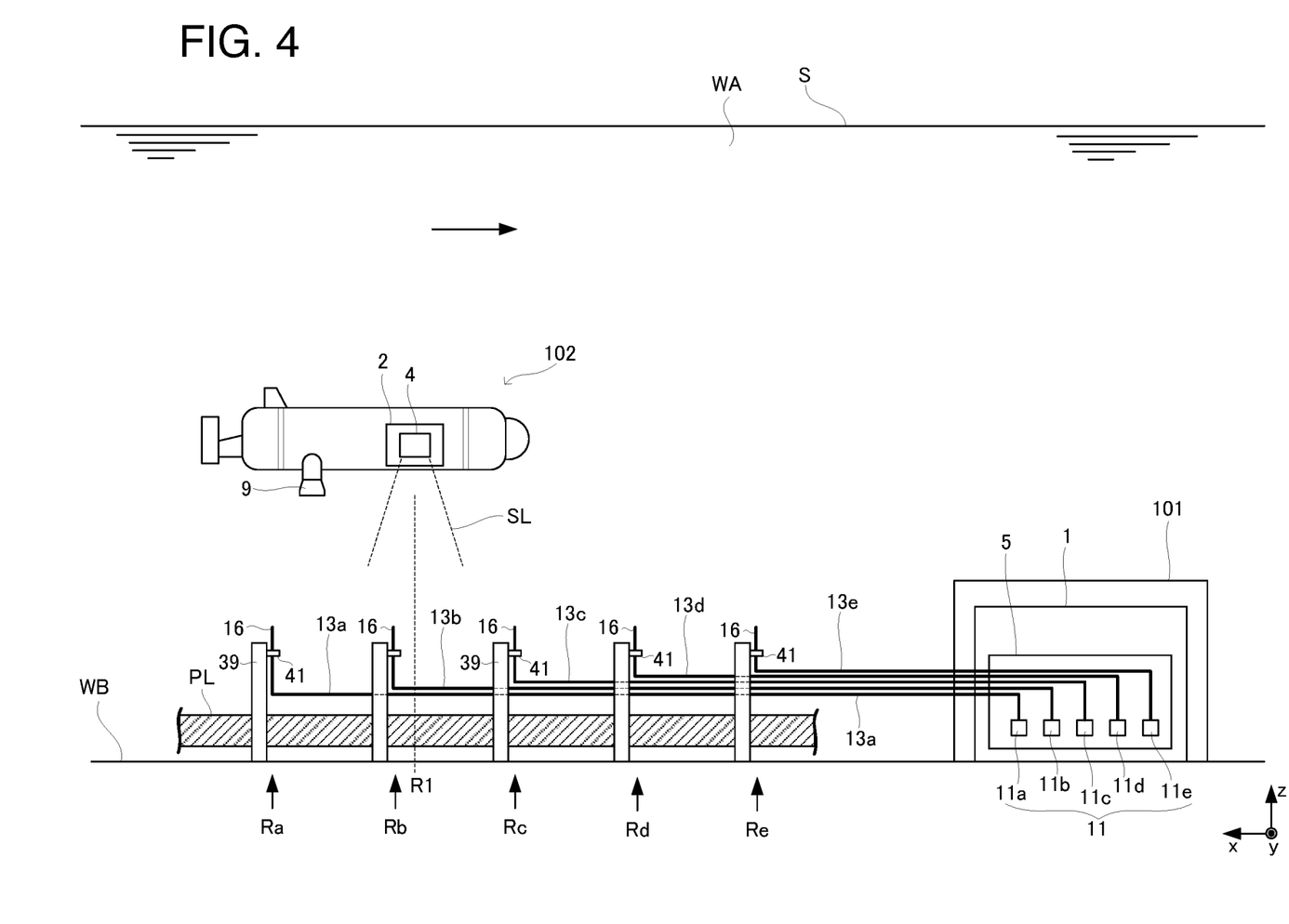
FIG. 4 is a schematic diagram showing the exemplary arrangement of optical fibers and the position of a moving body according to the first embodiment.

In each of the plurality of optical fibers 13, the light-emission end portion 17 is arranged within the protection container. On the other hand, the light-incident end portion 16 is arranged outside the protection container, 15. That is, the light-incident end portion 16 is configured to be capable of being arranged in the water WA. That is, by arbitrarily setting the length and the arrangement path of the optical fiber 13, the light-incident end portion 16 can be arranged at a desired position in the water WA. In this embodiment, as shown in FIG. 4, the light-incident end portions 16 of the optical fibers 13a to 13e are arranged at five different positions Ra to Re, respectively.

Figure 3:
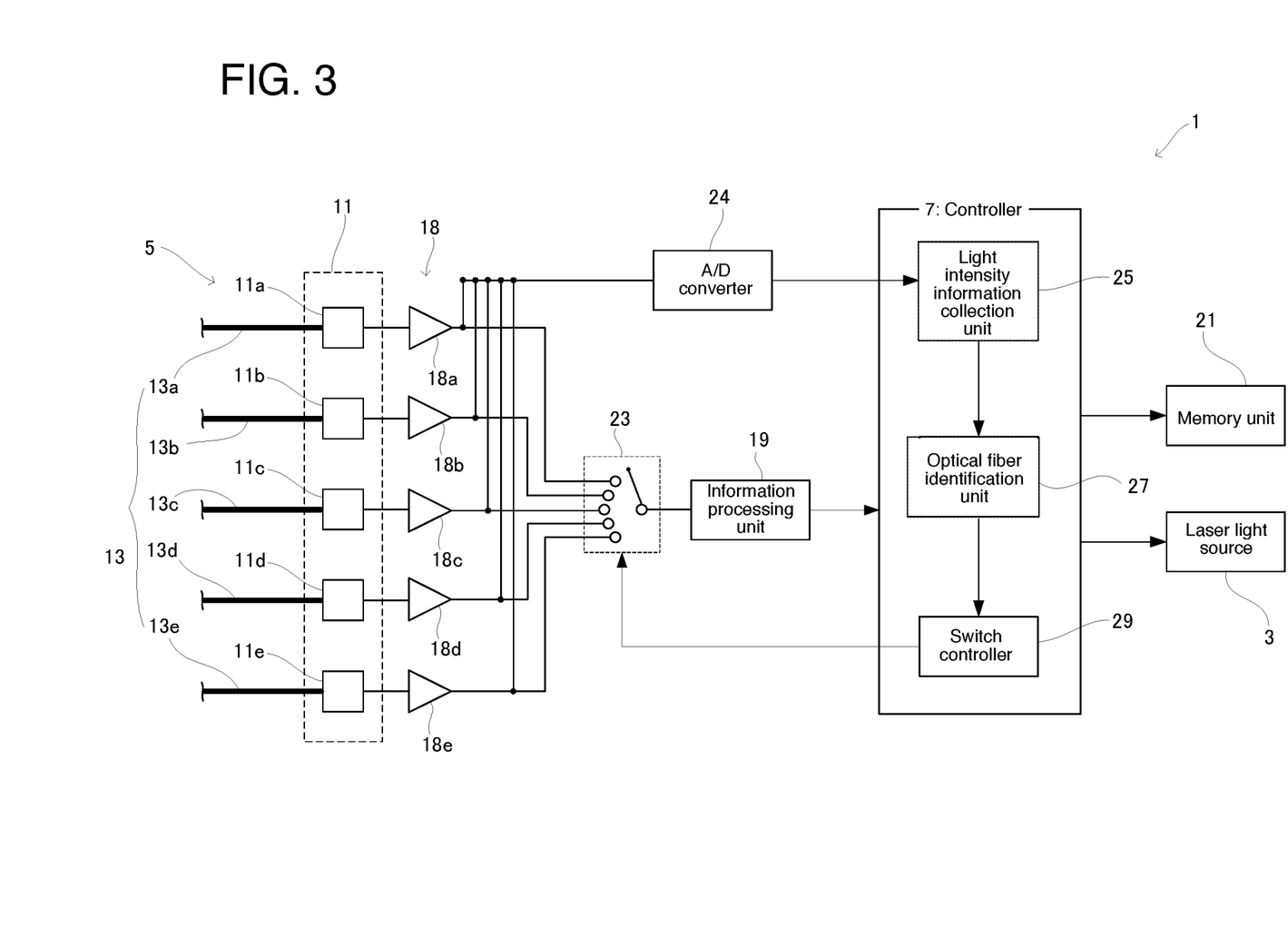
FIG. 3 is a functional block diagram for explaining a configuration of the optical communication device according to the first embodiment.

The optical receiver 5 is provided with, as shown in FIG. 3, a plurality of amplifiers 18 for amplifying the signal photoelectrically converted in the light-receiving element 11. The plurality of amplifiers 18 is provided to the corresponding light-receiving element 11. In this embodiment, five amplifiers 18 are provided. These amplifiers are distinguished as amplifiers 18a to 18e corresponding to the light-receiving elements 11a to 11e, respectively.

The optical communication device 1 is further provided with, as shown in FIG. 3, an information processing unit 19, a memory unit 21, a switch unit 23, an A/D converter 24, a light intensity information collection unit 25, an optical fiber identification unit 27, and a switch controller 29.

The information processing unit 19 performs various information processing on the signal of the communication light CL photoelectrically converted by the light-receiving element 11 and amplified by the amplifier 18. With this, communication information exemplified by image information is generated. The memory unit 21 stores various kinds of information. The communication information generated by the information processing unit 19 is stored in the memory unit 21 via the controller 7.

The switch unit 23 is provided on the downstream side of the amplifier 18 and on the upstream side of the information processing unit 19. The switch unit 23 is configured to switch the circuitry such that the signal to be transmitted to the information processing unit 19 can be selected out of the signals amplified by the amplifier 18. That is, it is possible to arbitrarily select an optical signal to have its information transmitted to the information processing unit 19 to be used as communication information out of the optical signals incident on the optical fibers 13a to 13e by the switch unit 23.

The A/D converter 24 is provided on the downstream side of the amplifier 18 so as to be branched from the switch unit 23 and is configured to perform an A/D conversion for the optical signal amplified by the amplifier 18. With the processing by the A/D converter 24, the information about the intensity of the light received the optical fiber 13 is generated as light intensity information. The light intensity information collection unit 25 is provided on the downstream side of the A/D converter 24. The light intensity information collection unit 25 collects the light intensity information on the light received by each of the optical fibers 13a to 13e.

The optical fiber identification unit 27 is provided on the downstream side of the light intensity information collection unit 25. The optical fiber identification unit 27 identifies the optical fiber 13 that is receiving relatively strong light out of the optical fibers 13a to 13e. In the first embodiment, the optical fiber identification unit 27 identifies the optical fiber 13 that is receiving relatively strong light by comparing the light intensity information on the light received by the optical fibers 13a to 13e.

The switch controller 29 is provided on the downstream side of the optical fiber identification unit 27. The switch controller 29 performs the switching control of the switch unit 23 such that the optical fiber identified as the optical fiber 13 that is receiving relatively strong light out of the optical fibers 13a to 13e is circuitry connected to the information processing unit 19. With the control performed by the switch controller 29, the optical signals transmitted by the optical fibers 13 that are receiving relatively weak light are excluded from the processing target as communication information. This improves the signal-to-noise ratio (S/N value) of the communication.

Application Example of First Embodiment

Next, application examples of the first optical communication device 1 and the second optical communication device 2 according to the first embodiment will be described. In this embodiment, as shown in FIG. 4, a pipeline PL is arranged along the x-direction. The moving body 102 performs the optical wireless communication from the second optical communication device to the first optical communication device 1 while performing the inspection while moving along the pipeline PL. Note that the position of the laser light source 4 provided in the moving body 102 in the x-direction is denoted as R1.

The light-incident end portions 16 of the optical fibers 13a to 13e are arranged at five different positions Ra to Re in the x-direction. That is, the optical fiber 13a corresponding to the light-receiving element 11a is fixed to a column 39 with a fixture 41 such that the light-incident end portion 16 is arranged at the position Ra. Further, the optical fiber 13b corresponding to the light-receiving element 11b is fixed to a column 39 with a fixture 41 such that the light-incident end portion 16 is arranged at the the position Rb. In the same manner, by using a column 39 and a fixture 41, the light-incident end portions 16 of the optical fibers 13c to 13e are fixedly arranged at positions Rc to Re.

In the first optical communication device 1, which is the receiving side device, the light-incident end portions 16 of the optical fibers 13a to 13e are fixedly arranged at locations mutually away from each other. For this reason, in the case of generating the communication information by the information processing unit 19 by utilizing all of the optical signals transmitted from the optical fibers 13a to 13e, the generated communication information is likely to be deteriorated in the accuracy by noise components.

That is, relatively strong light is incident on the light-incident end portion 16 of the optical fiber 13 relatively close to the laser light source 4 transmitting an optical signal. Therefore, the optical signal detected by the light-receiving element 11 corresponding to the optical fiber 13 is a relatively high S/N value. On the other hand, the light incident on the optical fiber 13 far from the laser light source 4 is poor in intensity. Therefore, the optical signal detected by the light-receiving element 11 corresponding to the optical fiber 13 far from the laser light source 4 is low-quality information having a low S/N value. Therefore, when generating a communication information by summing all of the optical signals transmitted from the optical fibers 13a to 13e, the S/N value of the communication information decreases.

Therefore, in this embodiment, as a stage before performing the optical wireless communication by emitting communication light CL, the operation of identifying an optical fiber 13 suitable for the optical wireless communication out of the optical fibers 13c to 13e is performed. Hereinafter, each operation will be described. Note that in the default state, it is controlled such that the switch unit 23 is turned off.

Step S1 (Emission of Light)

First, from the second optical communication device 2 on the transmission side, the light for identifying the optical fiber 13 is emitted to the first optical communication device 1. That is, as shown in FIG. 4, from the laser light source 4 mounted on the moving body 102, search light SL is emitted toward the light-incident end portions 16 of the optical fibers 13a to 13e. The search light SL for identifying the optical fiber 13 in this embodiment is light that does not contain communication information unlike the communication light CL. The search light SL incident on each of the light-incident end portions 16 of the optical fibers 13a to 13e is transmitted to the light-emission end portion 17 and detected by each of the light-receiving elements 11a to 11e.

Step S2 (Collection of Light Intensity Information)

The optical signals detected by the light-receiving elements 11a to 11e are each photoelectrically converted and amplified by the respective amplifiers 18a to 18e. The amplified signal is converted to digital information by the A/D converter 24. With the digital conversion, the information on the intensity of the search light SL incident on each of the optical fibers 13a to 13e is acquired as light intensity information. Each acquired light intensity information is collected by the light intensity information collection unit 25.

Step S3 (Identification of Optical Fiber)

The light intensity information on the search light SL received by each of the optical fibers 13a to 13e collected by the light intensity information collection unit 25 is transmitted to the optical fiber identification unit 27. The optical fiber identification unit 27 identifies the optical fiber 13 on which relatively intense light is being incident, by comparing the light intensity information.

Figure 5:
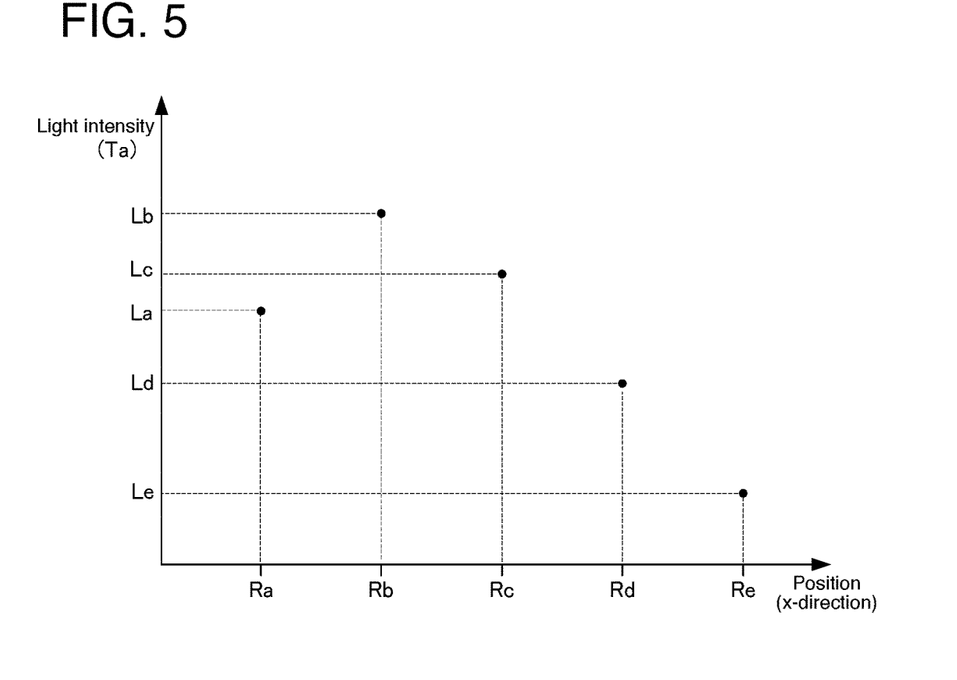
FIG. 5 is a diagram showing the light intensity of the light received by the respective optical fibers according to the first embodiment.

FIG. 5 shows the light intensity information on the search light SL collected in a state in which the moving body 102 is moving as shown in FIG. 4. Here, the light intensity of the search light SL incident on the respective optical fibers 13a to 13e is denoted as light intensity information La to Le, respectively.

In the state of FIG. 4, out of the positions Ra to Re where the light-incident end portions 16 are arranged, the position Rb is closest to the position R1 of the laser light source 4, and the position Rc is next closest to the position R1. The position Re is furthest. The intensity of the light incident on the light-incident end portion 16 of the optical fiber 13 decreases as the distance from the laser light source 4 emitting light to the light-incident end portion 16 increases. Therefore, out of the light intensity information La to Le, the light intensity information Lb corresponding to the laser light source 4 closest to the optical fiber 13b becomes highest in the light intensity.

That is, the optical fiber identification unit 27 compares the information on the collected light intensity information La to Le to identify the information on the highest light intensity. This enables the identification of the optical fiber 13 on which relatively strong light is being incident. In a case where the values of the collected light intensity information are as shown in FIG. 5, it is determined that the light intensity information Lb is the highest in the light intensity. With this, the optical fiber identification unit 27 identifies that the optical fiber 13 to which strong light is incident is the optical fiber 13b.

Step S4 (Control of Switch)

The switch controller 29 performs the switching control of the switch unit 23 based on the information on the optical fiber 13 identified by the optical fiber identification unit 27. In a case where the optical fiber 13 identified by the optical fiber identification unit 27 is the optical fiber 13b, the switch controller 29 switches the switch unit 23 such that the amplifier 18b corresponding to the optical fiber 13b is turned on. With this switching control, signals having relatively high noise transmitted by the optical fibers 13 far from the laser light source 4 can be shut off from the information processing unit 19.

Step S5 (Emission of Communication Light)

The switching control of the switch unit 23 is performed, and the optical wireless communication by the first optical communication device 1 and the second optical communication device 2 is initiated. That is, the second optical communication device 2 emits the communication light CL containing communication information from the laser light source 4 to the first optical communication device 1.

The communication light CL is incident on each of the optical fibers 13a to 13e and detected by each of the light-receiving elements 11a to 11e. Here, only the amplifier 18b out of the amplifiers 18 is turned on by the operation of Steps S1 to S4. Therefore, only the detection signal amplified by the amplifier 18b and photoelectrically converted by the light-receiving element 11b is transmitted to the information processing unit 19.

Step S6 (Generation of Communication Information)

The information processing unit 19 performs various information processing on the detection signal transmitted via the amplifier 18b to generate communication information based on the communication light CL. Compared with the other light-receiving elements 11, the signal detected by the light-receiving element 11b has a higher S/N value. Therefore, the information processing unit 19 can generate highly reliable communication information based on the detection signal having the higher S/N value.

The generated communication information is stored in the memory unit 21 and used as appropriate. For example, by connecting the fixed structure 101 to a ship on the water in advance by a wired cable or the like, the information observed by the moving body 102 can be transmitted to the ship by the underwater optical communication system 100. By the above-described operation, the underwater optical wireless communication by this embodiment is performed.

Effects of First Embodiment

The optical communication device 1 according to this embodiment is provided with a plurality of light-receiving elements 11, a plurality of optical fibers 13, a plurality of amplifiers 18, the light intensity information collection unit 25, the optical fiber identification unit 27, and the switch controller 29. The plurality of light-receiving elements 11 outputs a light detection signal by receiving light. The plurality of optical fibers 13 is provided to correspond to the plurality of light-receiving elements 11, respectively, and guides light to the corresponding light-receiving elements 11. The plurality of amplifiers 18 is provided to correspond to the plurality of light-receiving elements 11, respectively, and optical communication information is generated by performing signal processing on the light detection signal. The light intensity information collection unit 25 collects the intensity of the light received by each of the plurality of optical fibers 13 as light intensity information La to Le. The optical fiber identification unit 27 identifies the optical fiber 13 that is emitting relatively strong light out of the plurality of optical fibers 13, based on the light intensity information La to Le collected by the light intensity information collection unit 25. The switch controller 29 controls the amplifier 18 provided to correspond to the optical fiber 13 identified by the optical fiber identification unit 27 to an on-state.

With this configuration, it is possible to identify, out of the plurality of optical fibers 13, the optical fiber 13 relatively close to the second optical communication device 2 that is a communication partner that generates light. The optical fiber 13 identified by the optical fiber identification unit 27 is an optical fiber 13 capable of transmitting an optical signal having a relatively high S/N value. Therefore, by generating optical communication information by selectively using the detection signal based on the light guided to the light-receiving element 11 by the identified optical fiber 13, it is possible to perform high-precision optical wireless communication with low noise components. Further, the operation of identifying the optical fiber 13 is performed using the search light SL. In other words, since all kinds of operations are performed using highly directional light, the accuracy of the optical communication can be improved while improving the confidentiality of communication. Further, since there is no need to perform acoustic positioning using an acoustic device, it is possible to easily realize miniaturization and weight reduction of the optical communication device.

The light-incident end portions 16 of the plurality of optical fibers 13 are arranged at different positions in the water. Since the optical fiber 13 is highly flexible and can flexibly select the disposition path, the plurality of light-incident end portions 16 can be arranged at desired positions in the water. Therefore, the receivable range of the optical wireless communication can be widened.

In a case where the optical fibers 13 are arranged at positions away from each other to increase the receivable range of the optical wireless communication, the following facts were found. That is, it was found that a decrease in the information accuracy due to noise occurs when generating optical communication information by summing all of the optical signals transmitted from the respective optical fibers 13. In contrast, in the case of generating optical communication information by selecting the signal corresponding to the optical fiber 13 identified by the optical fiber identification unit 27, it is possible to generate optical communication information by excluding the high-noise signals acquired by the optical fibers 13 relatively far from the second optical communication device 2 that is a communication partner. Therefore, it is possible to improve the accuracy of the optical communication information while expanding the receivable range of the optical wireless communication.

Further, the plurality of optical fibers 13 equipped by the first optical communication device 1 is attached to the fixedly installed fixed structure 101. Since the positions of the plurality of optical fibers 13 are fixed, the reliability of the light intensity information La to Le collected by the light intensity information collection unit 25 and the information on the optical fiber 13 identified by the optical fiber identification unit 27 can be further improved.

Second Embodiment

Next, a second embodiment of the present invention will be described. In the second embodiment, examples will be described in which a position calculation unit, a movement parameter calculation unit, etc., are further provided, in addition to the first embodiment. Note that the same component as that of the first embodiment is denoted by the same reference symbol, and the description thereof will be omitted.

Figure 6:
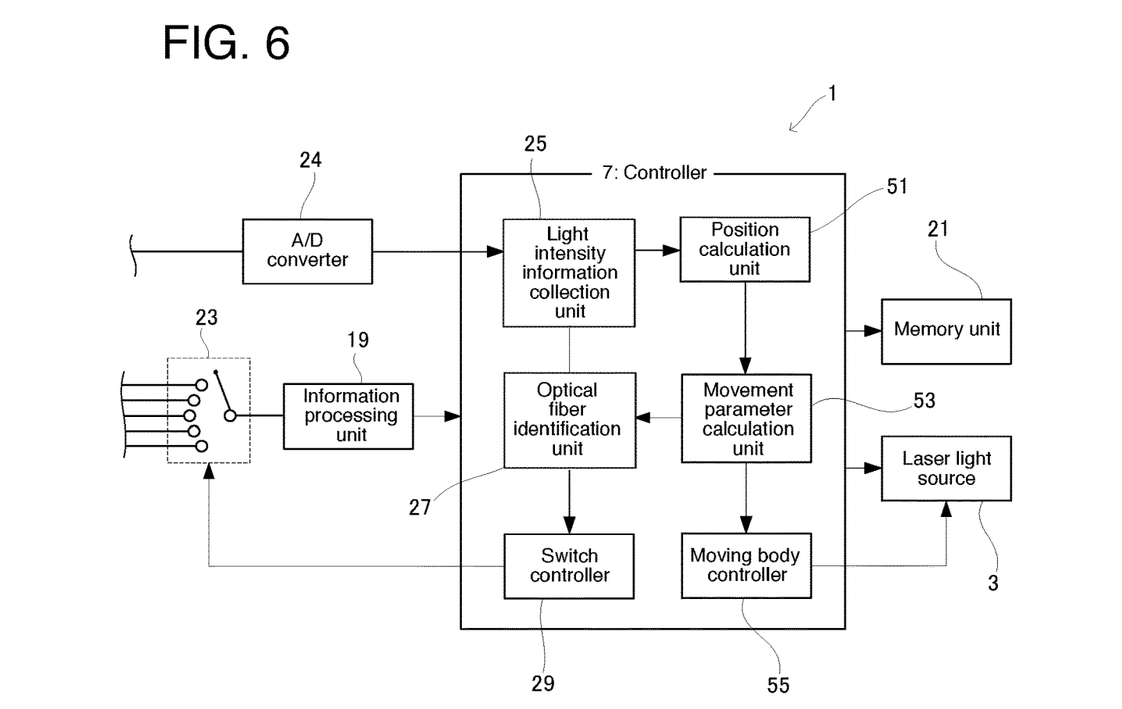
FIG. 6 is a functional block diagram illustrating the main part of the optical communication device according to a second embodiment.

FIG. 6 is a functional block diagram showing a main part of a first optical communication device 1 according to a second embodiment. The first optical communication device 1 according to the second embodiment is further provided with a position calculation unit 51, a movement parameter calculation unit 53, and a moving body controller 55.

The position calculation unit 51 is provided on the downstream side of the light intensity information collection unit 25. The position calculation unit 51 calculates, based on the light intensity information acquired for each of the plurality of optical fibers 13*a* to 13*e*, the position information on the source (here, the laser light source 4) of the light incident on the optical fiber 13. The movement parameter calculation unit 53 is provided on the downstream side of the position calculation unit 51. The movement parameter calculation unit 53 calculates the moving speed and the moving direction of the source of the light incident on the optical fiber 13, based on the transition of the position information acquired by the position calculation unit 51. In other words, the relative moving speed and moving direction of the second optical communication device 2 with respect to the first optical communication device 1 are calculated by the movement parameter calculation unit 53.

The moving body controller 55 controls the moving speed or the moving direction of the moving body 102 on which the laser light source 4 is mounted, based on the information on the moving speed and the moving direction calculated by the movement parameter calculation unit 53. That is, by controlling the operation of the laser light source 3 equipped by the first optical communication device 1 by the moving body controller 55, communication light CL for controlling the moving speed or the moving direction of the moving body 102 is emitted from the laser light source 3.

A specific configuration for controlling the moving speed or the moving direction of the moving body 102 can be exemplified by the following. That is, the information on the relative moving speed and moving direction of the second optical communication device 2 is transmitted to an external station from the movement parameter calculation unit 53 via the controller 7 and a cable. Then, in the external station, the content of the command for controlling the moving speed or the moving direction of the moving body 102 is determined. Thereafter, the information on the command is transmitted from the external station to the moving body controller 55 via a cable and the controller 7.

Application Example of Second Embodiment

Here, an application example of the first optical communication device 1 and the second optical communication device 2 according to the second embodiment will be described.

Figure 7:
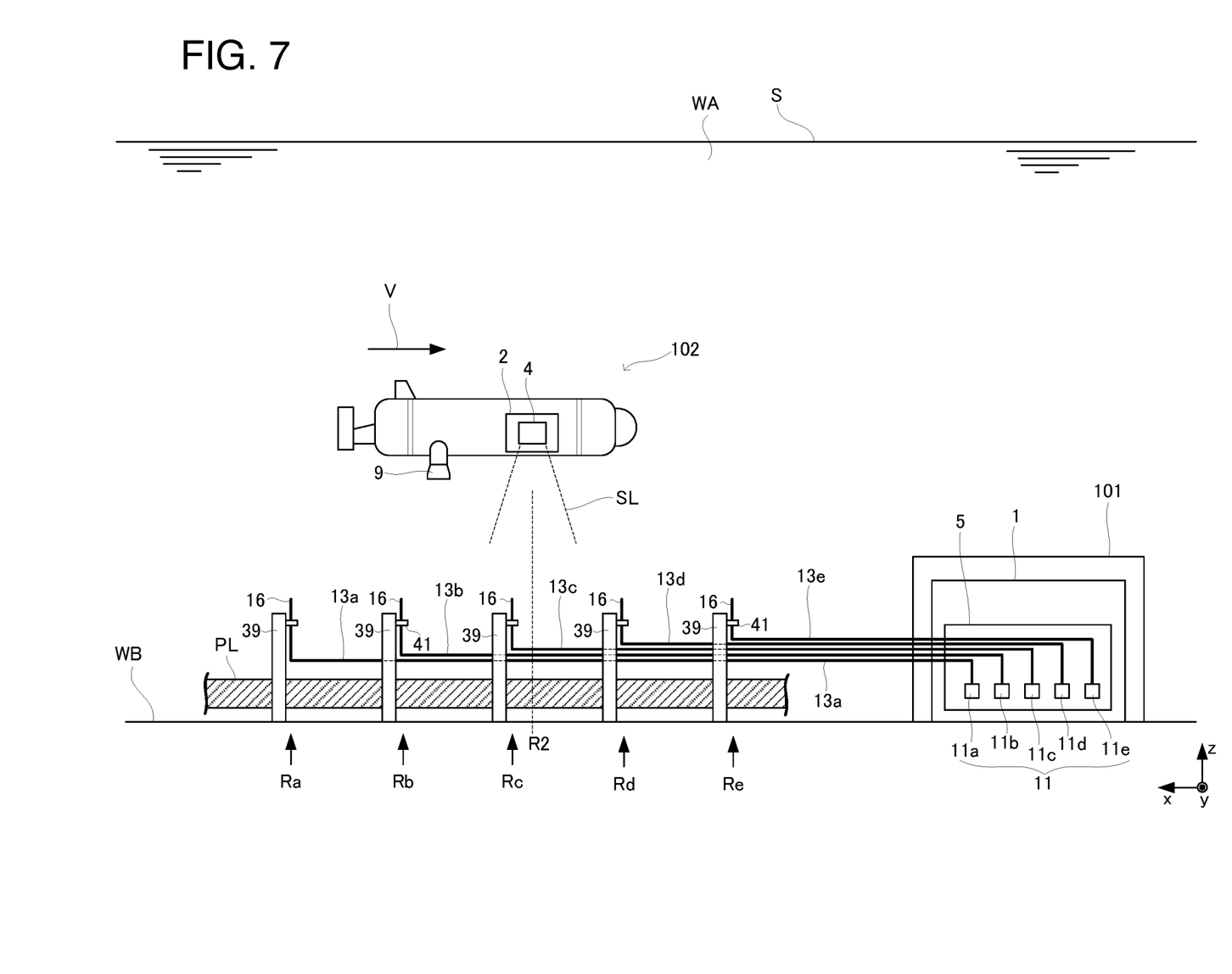
FIG. 7 is a schematic diagram showing a state in which a moving body has moved in the second embodiment.

Note that in the second embodiment, it is assumed that the laser light source 4 is positioned at the position R1 as shown in FIG. 4 at the time Ta. Then, at the time Tb at which a time has elapsed from the time Ta, as shown in FIG. 7, it is assumed that the moving body 102 has moved along the arrow indicated by the reference symbol V and that the laser light source 4 has moved to the position R2. Out of the positions Ra to Re, the position R2 is closest to the position Rc and is next closest to the position Rd. The position Ra is farthest from the position R2.

In the second embodiment, in addition to the operations of Steps S1 to S6 performed in the first embodiment, the operations of Steps SA1 to SA4 described below are also performed.

Step SA1 (Calculation of Position of the Communication Partner)

In the second embodiment, the light intensity information on the search light SL inputted to the respective optical fibers 13a to 13e is collected by the operation according to Step S2. Thereafter, the operation according to Step S3 is performed using the light intensity information, and the operation according to Step SA1 is performed. That is, the light intensity information on the search light SL incident on the respective optical fibers 13a to 13e is transmitted to the optical fiber identification unit 27 and the position calculation unit 51.

The position calculation unit 51 performs, based on each of the transmitted light intensity information, arithmetic processing for calculating the current position of the second optical communication device 2, which is a communication partner. When light propagates in water, the light intensity is attenuated according to the propagation distance. That is, the intensity of the light incident on the light-incident end portion 16 of the optical fiber 13 which is close to the laser light source 4 is relatively high, and the intensity of the light incident on the light-incident end portion 16 which is farther from the laser light source 4 is relatively low.

That is, by comparing the values of the light intensity information La to Le shown in FIG. 5, from the laser light source 4 which is the source of the search light SL, the position of the laser light source 4 between the positions Ra to Re of the light-incident end portions 16 of the optical fiber 13a to 13e can be calculated. In a case where the light intensity information is a numeric value shown in FIG. 5, the light intensity information Lb is the highest, and the light intensity information Lc is the next highest. The light intensity information Le is the lowest. Therefore, the position of the laser light source 4 in the x-direction can be identified to be located between the position Rb and the position Rc and positioned at a position R1 that is relatively close to the position Rb. The specific position of the position R1 between the position Rb and the position Rc can be specified by the ratio of the light intensity information Lb to the light intensity information Lc. The information on the identified position R1 is transmitted to the movement parameter calculation unit 53.

Step SA2 (Calculation of Movement Parameter)

The position calculation unit 51 calculates the position information on the laser light source 4 at a plurality of time points. Based on the position information on the laser light source 4 at the plurality of time points, the movement parameter calculation unit 53 calculates the moving speed and the moving direction of the laser light source 4.

Figure 8:
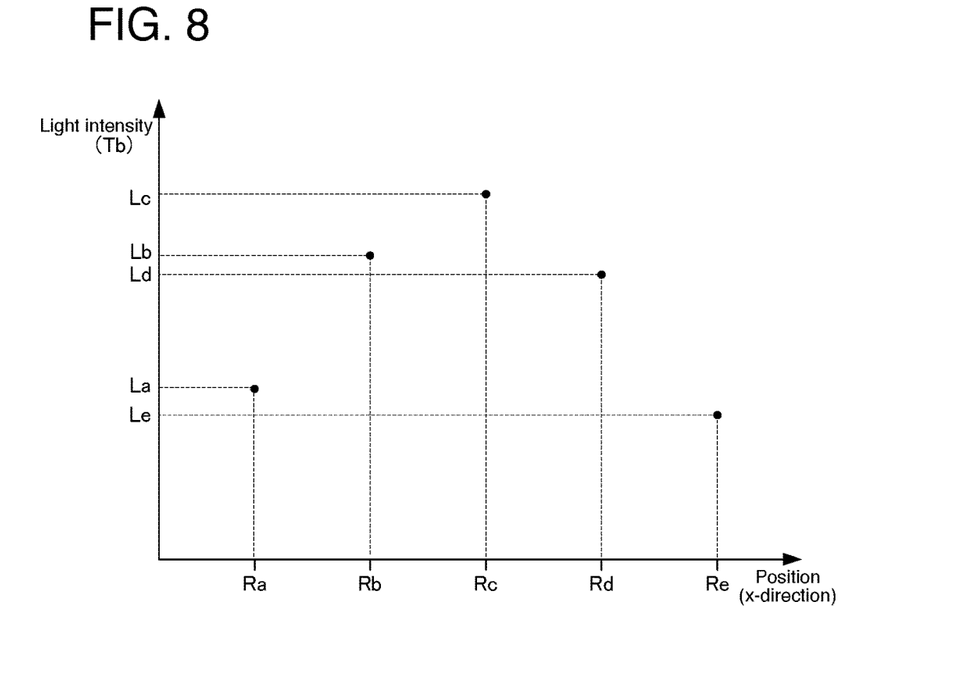
FIG. 8 is a diagram showing the light intensity of the light received by the respective optical fibers in a state in which a moving body has moved in the second embodiment.

An example is shown in which in the second embodiment, the position calculation unit 51 calculates the position of the laser light source 4 at the time Ta and the time Tb. The light intensity information La to Le collected at the time Ta is as shown in FIG. 5. In this case, the position calculation unit 51 can calculate such that the position of the laser light source 4 is at the position R1. Next, the moving body 102 at the time Tb is positioned as shown in FIG. 7, and the light intensity information La to Le acquired in this positional relation is as shown in FIG. 8. In this case, the position calculation unit 51 can calculate that the position of the laser light source 4 at the time Tb is the position R2, based on the light intensity information La to Le at the time Tb.

The movement parameter calculation unit 53 can calculate the information on the moving speed and the moving direction of the laser light source 4 as the movement parameter of the laser light source 4, by the distance and the direction from the position R2 to the position R1, and the difference between the time Tb and the time Ta. The calculated information also corresponds to the moving speed and the moving direction of the moving body 102 mounting the laser light source 4.

Step SA3 (Operation Control of Moving Body)

By using the movement parameter of the laser light source 4 acquired in Step SA2, at least one of the operations of Step SA3 and Step SA4 can be performed. In Step SA3, the operation control of the moving body 102 is performed based on the movement parameter of the laser light source 4. The information on the movement parameter of the laser light source 4 is transmitted from the movement parameter calculation unit 53 to the moving body controller 55. The moving body controller 55 predicts the position of the moving body 102 at the time Tb and thereafter, based on the movement parameter of the laser light source 4.

Figure 9:
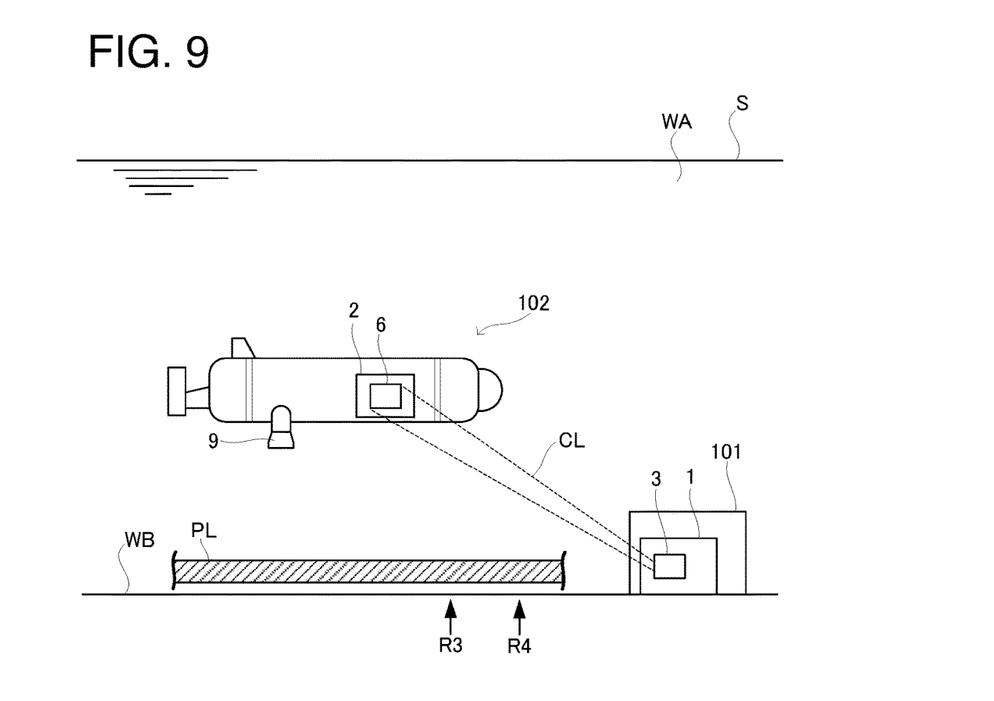
FIG. 9 is a schematic diagram showing a state in which an optical signal for controlling the movement of the moving body is emitted in the second embodiment.

The moving body controller 55 controls the laser light source 3 based on the predicted result of the position of the moving body 102 and transmits, as shown in FIG. 9, the communication light CL of the contents for controlling the operation of the moving body 102 from the first optical communication device 1 to the second optical communication device 2.

The prediction and the controls by the moving body controller 55 can be exemplified by the following. As an example, in a case where the locations of the pipeline PL to be inspected are the position R3 and the position R4, the moving body controller 55 can predict the time at which the moving body 102 moves to each of the position R3 and the position R4 by the movement parameter of the laser light source 4. Then, based on the prediction, the moving body controller 55 can execute the control to emit the communication light CL indicating the inspection of the pipeline PL by initiating the observation device 9 at the expected arrival time to the position R3 and the expected arrival time to the position R4 from the laser light source 3 to the optical receiver 6.

Another example of the operation control of the moving body 102 by the moving body controller 55 includes the control to change the moving speed or the moving direction of the moving body 102. That is, in a case where the moving speed of the moving body 102 calculated by the movement parameter calculation unit 53 is unexpectedly large, the moving body controller 55 performs control to emit communication light CL containing the information indicating to reduce the moving speed of the moving body 102 from the laser light source 3.

Step SA4 (Predictive Control of Switch Unit)

By using the movement parameter of the laser light source 4 acquired in Step SA2, it is also possible to perform the predictive control of the switch unit 23. That is, from the movement parameter of the laser light source 4, it is possible to predict the time zone at which a particular optical fiber 13 out of the optical fibers 13a to 13e becomes closest to the laser light source 4 after the time Tb. By transmitting the information on the predicted time zone from the movement parameter calculation unit 53 to the optical fiber identification unit 27, the optical fiber identification unit 27 can identify the optical fiber 13 on which relatively strong light is incident without emitting search light SL at the time Tb and thereafter.

As an example, it is assumed that the time at which the optical fiber 13 that is closest to the laser light source 4 is the optical fiber 13d is the time Tc to Td and that the time at which the optical fiber 13 that is closest to the laser light source 4 is the optical fiber 13e is the time Td to Te. At the time Tb, by specifying the optical fiber 13 using the search light SL, the light intensity information Lc based on the optical fiber 13c is highest (see FIG. 8). Therefore, the switch unit 23 performs the switch control such that the amplifier 18c is turned on.

On the other hand, after the movement parameter is acquired at the time Tb, the operation for identifying the optical fiber 13 using the search light SL is terminated, and the operation for identifying the optical fiber 13 is performed according to the prediction based on the movement parameter. That is, at the time Tc at which a time has elapsed from the time Tb, the optical fiber identification unit 27 automatically identifies that the optical fiber 13 on which relatively strong light is incident is the optical fiber 13d. Then, at the time Tc to Td, the switch controller 29 performs the switch control with respect to the switch unit 23 such that the amplifier 18d is turned on.

At the time Td at which a time has further elapsed, the optical fiber identification unit 27 automatically identifies that the optical fiber 13 on which relatively strong light is incident is the optical fiber 13e. Then, at the time Td to Te, the switch controller 29 performs the switching control with respect to the switch unit 23 such that the amplifier 18e is turned on. In a case where the moving body 102 has moved outside the communicable range of the first optical communication device 1 after a time has further elapsed, the movement parameter calculation unit 53 can predict the time during which the moving body has moved in advance and terminates the operation of the optical wireless communication by the underwater optical communication system 100 at the predicted time. Therefore, it is possible to avoid the situation in which the power is uselessly exhausted due to the continuous useless operation after the distance between the first optical communication device 1 and the second optical communication device 2 has increased.

Effects of Second Embodiment

The optical communication device 1 according to this embodiment is provided with the movement parameter calculation unit 53 and the moving body controller 55. The movement parameter calculation unit 53 detects the temporal transition of the light intensity information and calculates the relative moving speed of the second optical communication device 2 with respect to the plurality of optical fibers 13 based on the transition. The moving body controller 55 transmits, based on the relative moving speed, the optical signal for controlling the movement of the second optical communication device 2 to the second optical communication device 2.

With this configuration, by calculating the moving speed of the second optical communication device 2, it is possible to easily grasp whether or not the movement control of the second optical communication device 2 is required and control the movement of the second optical communication device 2. Further, based on the moving speed of the second optical communication device 2, it is possible to accurately predict the timing at which the second optical communication device 2 deviates from the communicable range of the first optical communication device 1. Therefore, the accuracy of the timing to start and stop the underwater optical wireless communication can be improved.

In the case of identifying the optical fiber 13 by comparing the light intensity information acquired at each position at a predetermined time as in the first embodiment, it is required to emit the search light SL as a stage prior to emit the communication light CL each time the optical wireless communication is performed. On the other hand, in the case of performing the predictive control of the switch unit 23 using the movement parameter, after acquiring the movement parameter, there is no need to use the search light SL to identify the optical fiber 13. For this reason, it is possible to avoid the generation of a lag between the time of specifying the optical fiber 13 and the time of starting the optical wireless communication by irradiating the communication light CL.

Aspect

It will be understood by those skilled in the art that the above-described exemplary embodiments are concrete examples of the following aspects.

(Item 1)

An optical communication device according to one aspect of the present invention includes:

a plurality of light-receiving elements each configured to output a light detection signal by receiving light;

a plurality of optical fibers provided to correspond to the plurality of light-receiving elements, respectively, the plurality of optical fibers each being configured to guide the light to the corresponding light-receiving element;

a plurality of signal processing units provided to correspond to the plurality of light-receiving elements, respectively, the plurality of signal processing units each being configured to generate optical communication information by performing signal processing on the light detection signal;

a light intensity information collection unit configured to collect intensity of the light incident on each of the plurality of optical fibers as light intensity information;

an optical fiber identification unit configured to identify the optical fiber on which relatively strong light is incident out of the plurality of optical fibers, based on the light intensity information collected by the light intensity information collection unit; and a signal processing controller configured to control to turn on the signal processing unit, the signal processing unit being provided to correspond to the optical fiber identified by the optical fiber identification unit.

According to the optical communication device as recited in the above-described Item 1, a light intensity information collection unit is provided. The light intensity information collection unit is configured to collect the intensity of the light incident on each of the plurality of optical fibers for guiding light to the plurality of light-receiving elements that output a light detection signal by receiving light, as light intensity information. Based on the collected light intensity information, the optical fiber identification unit identifies the optical fiber on which relatively strong light is incident.

The identified optical fiber is an optical fiber that is relatively close to the position of the communication partner that generates the light. Therefore, as a consequence of the control by the signal processing controller, it is possible to perform optical communication using an optical fiber capable of efficiently performing signal processing of light. Therefore, it is possible to avoid a situation in which the S/N ratio deteriorates by using an optical fiber far from the communication partner. Also, a highly directional optical communication is used to identify an optical fiber that is relatively close to the communication partner. Therefore, the reliability of the optical communication can be improved while improving the confidentiality of the communication. In addition, it is not necessary to perform acoustic positioning using an acoustic device. Therefore, miniaturization and weight reduction of an optical communication device can be easily realized.

(Item 2)

The optical communication device as recited in the above-described Item 1 may be further provided with:

a light intensity transition detection unit configured to detect temporal transition of the light intensity information;

a moving speed calculation unit configured to calculate a relative moving speed of a light-emitting body with respect to the plurality of optical fibers, based on the temporal transition of the light intensity information detected by the light intensity transition detection unit; and an optical signal transmission unit configured to transmit an optical signal for controlling a movement of the light-emitting body to the light-emitting body, based on the relative moving speed.

According to the optical communication device as recited in the above-described Item 2, it is possible to easily grasp whether or not the movement control of the light-emitting body is required to control the movement of the light-emitting body by calculating the moving speed of the light-emitting body. Further, based on the moving speed of the light-emitting body, it is possible to accurately predict the timing at which the light-emitting body deviates from the communicable range of the optical communication device. Therefore, the accuracy of the timing to start and stop the underwater optical wireless communication can be improved.

(Item 3)

In the optical communication device as recited in the above-described Item 1 or 2, it may be configured such that the plurality of optical fibers is arranged on a fixed structure that is fixedly arranged.

According to the optical communication device as recited in the above-described Item 3, a plurality of optical fibers is fixed. Accordingly, it is possible to further improve the reliability of the light intensity information collected by the light intensity information collection unit and the information on the optical fiber identified by the optical fiber identification unit.

(Item 4)

The optical communication device as recited in the above-described Item 1 or 2, it may be configured such that the plurality of optical fibers is arranged on a fixed structure that is fixedly installed.

According to the optical communication device as recited in the above-described Item 4, even in the case of performing the underwater optical wireless communication between moving structures, the reliability of the communication can be improved while improving the confidentiality of the optical communication.

Other Embodiments

It should be understood that the examples disclosed herein are illustrative in all aspects and are not restrictive. The scope of the present invention includes all changes within claims, and the meanings and the range equivalent to the claims. For example, the present invention may be modified as follows.

Figure 10:
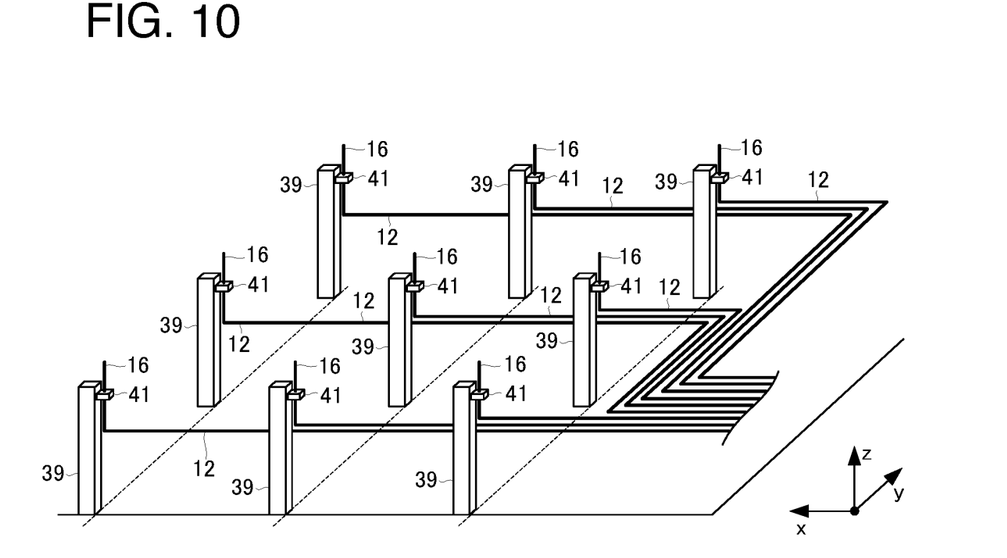
FIG. 10 is a diagram showing an arrangement pattern of a plurality of optical fibers according to modification.

(1) In each the above-described embodiments, for convenience of explanation, an example is shown in which the light-incident end portions 16 of the plurality of optical fibers 13 are arranged in parallel along one direction (x-direction), and the moving body 102 is moved along the direction, but the present invention is not limited thereto. That is, as shown in FIG. 10, a plurality of optical fibers 13 may be arranged by using columns 39 and fixtures 41 such that the light-incident end portions 16 of the plurality of optical fibers 13 are arranged in a two-dimensional matrix. In this case, by collecting the light intensity information on the light incident on each of the optical fibers 13 arranged in a two-dimensional matrix, it is possible to detect the position of the moving body 102 not only in the x-direction but also in the y-direction.

(2) In each of the above-described embodiments, a configuration is shown in which one optical fiber 13 is disposed at each of the positions Ra to Re, but the present invention is not limited thereto. That is, a plurality of optical fibers 13 may be arranged at the position Ra, and a plurality of optical fibers 13 may be arranged at each of the positions Rb to Re. In this case, the information acquired by summing or averaging the light intensity of the light incident on each of the plurality of optical fibers 13 arranged at the position Ra as an example is acquired as the light intensity information La.

Figure 11:
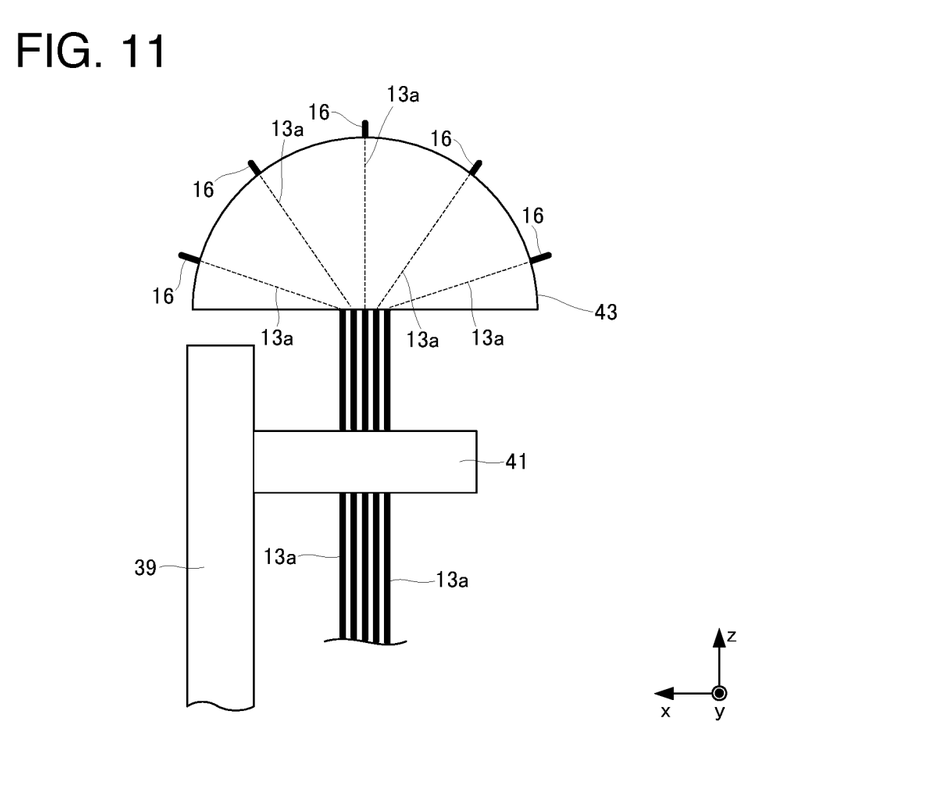
FIG. 11 is a diagram showing a configuration of a light-receiving end side of an optical fiber according to a modification.

Note that in the above-described modification in which a plurality of optical fibers 13 is arranged at one location, as shown in FIG. 11, a light-incident end portion holder 43 may be further arranged on the side of the light-incident end portion 16. The light-incident end portion holder 43 is configured to retain the plurality of light-incident end portions 16 such that the light-incident end portions are oriented in different directions. In FIG. 11, each of the plurality (here, five) optical fibers 13 arranged at the position Ra is denoted as an optical fiber 13*a*. With the light-incident end portion holder 43, the light-incident end portions 16 of the five optical fibers 13*a* are fixed in different orientations in a spread manner. By fixedly arranging the plurality of light-incident end portions 16 in different directions, it is possible to receive light in a wider range.

Figure 12:
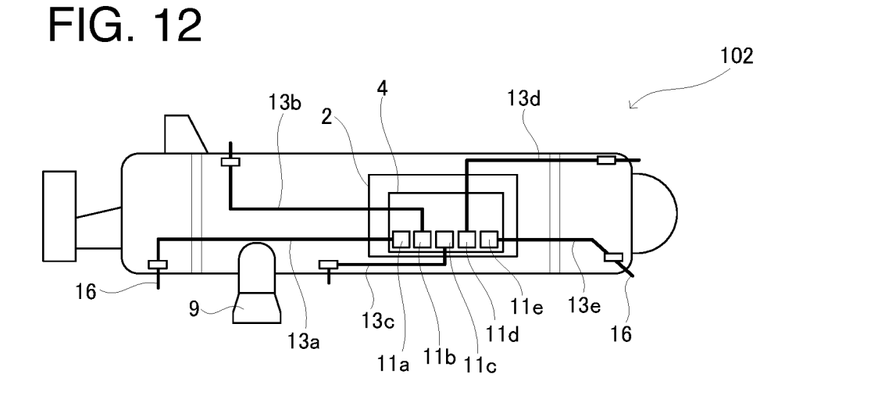
FIG. 12 is a schematic diagram showing an exemplary arrangement of an optical fiber according to a modification.

(3) In the above-described embodiments, the second optical communication device 2 may be provided with the configuration of the first optical communication device 1. In particular, the configuration of distributing the light-incident end portions 16 of the optical fibers 13 at a plurality of locations in the water is not limited to the configuration applied to the fixed structure 101 and may be provided on the moving body 102. FIG. 12 illustrates a configuration in which light-incident end portions 16 of five optical fibers 13 are arranged at five locations of the moving body 102.

By arranging a plurality of optical fibers 13 around the moving body 102, it is possible to apply the configuration and the operation according to each embodiment even in the case of performing the underwater optical wireless communication between moving bodies 102. That is, even in a case where underwater optical wireless communication is performed between moving structures, the reliability of the optical communication can be improved while improving the confidentiality of the optical communication. As an example, in a case where the optical wireless communication is performed while mutually moving the moving bodies 102, the relative moving speed and the moving direction of the other moving body 102 with respect to the one moving body 102 is calculated. Based on the information on the moving speed and the moving direction, the optical wireless communication indicating that the movement control capable of avoiding the interference is performed can be mutually performed.

(4) In each of the above-described embodiments, although the underwater optical communication system 100 is configured to perform the optical wireless communication between two optical communication devices, the optical wireless communication may be performed between three or more optical communication devices.

(5) In each of the above-described embodiments, the number of the optical fiber 13 specified by the optical fiber identification unit 27 is not limited to one. As an example, two or three or more optical fibers 13 having a larger value on the light intensity information may be identified. Alternatively, it may be configured such that all of the optical fibers 13 having the light intensity information value larger than a predetermined value is specified.

DESCRIPTION OF SYMBOLS

1: First optical communication device
2: Second optical communication device
3: Laser light source
4: Laser light source
5: Optical receiver
6: Optical receiver
7: Control unit
8: Control unit
9: Observation device
11: Light-receiving element
13: Optical fiber
16: Light-incident end portion
17: Light-emission end portion
18: Amplifier
19: Information processing unit
21: Memory unit
23: Switch unit
24: A/D converter
25: Light intensity information collection unit
27: Optical fiber identification unit
29: Switch controller
51: Position calculation unit
53: Movement parameter calculation unit
55: Moving body controller

The invention claimed is:

1. An optical communication device comprising:
   a plurality of light-receiving elements each configured to output a light detection signal by receiving light;
   a plurality of optical fibers provided to correspond to the plurality of light-receiving elements, respectively, the plurality of optical fibers each being configured to guide the light to the corresponding light-receiving element;
   a plurality of signal processing units provided to correspond to the plurality of light-receiving elements, respectively, the plurality of signal processing units each being configured to provide first communication information by performing signal processing on the corresponding light detection signal output by a corresponding one of the plurality of light-receiving elements;
   a light intensity information collection unit configured to collect information of the intensity of the light incident on each of the plurality of optical fibers as light intensity information;
   an optical fiber identification unit configured to identify the optical fiber on which relatively strong light is incident out of the plurality of optical fibers, based on the light intensity information collected by the light intensity information collection unit;
   a switch controller configured to select a first signal processing unit out of the plurality of signal processing units, the first signal processing unit corresponding to the optical fiber identified by the optical fiber identification unit; and
   a position calculation unit configured to calculate position information on a generation source of the light incident on the optical fiber, based on the light intensity information acquired for each of the plurality of optical fibers.

2. The optical communication device as recited in claim 1, further comprising:
   a light intensity transition detection unit configured to detect temporal transition of the light intensity information;
   a moving speed calculation unit configured to calculate a relative moving speed of a light-emitting body with respect to the plurality of optical fibers, based on the temporal transition of the light intensity information detected by the light intensity transition detection unit; and
   an optical signal transmission unit configured to transmit an optical signal for controlling a movement of the light-emitting body to the light-emitting body, based on the relative moving speed.

3. The optical communication device as recited in claim 1,
   wherein the plurality of optical fibers is arranged on a fixed structure that is fixedly arranged.

4. The optical communication device as recited in claim 1,
   wherein the plurality of optical fibers is arranged on a moving structure.

5. The optical communication device as recited in claim 1, wherein in response to identifying the optical fiber on which relatively strong light is incident out of the plurality of optical fibers, the switch controller is configured to shut off the plurality of signal processing units other than the first signal processing unit.

\* \* \* \* \*